United States Patent [19]

Garcia

[11] Patent Number: 4,813,638
[45] Date of Patent: Mar. 21, 1989

[54] BIPOD MORTAR STAND, COMPRISING ONE SUPPORT MECHANISM AND ONE LIFTING MECHANISM

[75] Inventor: Jose G. Garcia, Vizcaya, Spain
[73] Assignee: Esperanza y Cia, S.A., Spain
[21] Appl. No.: 124,068
[22] Filed: Nov. 23, 1987
[51] Int. Cl.[4] ............................................. F16M 11/38
[52] U.S. Cl. .................................. 248/171; 248/163.1; 248/169
[58] Field of Search ............... 248/171, 168, 169, 170, 248/163.1, 163.2, 188, 188.1

[56] References Cited

U.S. PATENT DOCUMENTS

| | | | |
|---|---|---|---|
| 2,493,978 | 1/1950 | Kromer | 248/169 X |
| 2,708,559 | 5/1955 | Du Mais | 248/171 |
| 3,051,425 | 8/1962 | Homrighausen | 248/168 |
| 3,722,847 | 3/1973 | O'Connor | 248/171 X |
| 3,741,509 | 6/1973 | Kelly | 248/171 |
| 3,786,766 | 1/1974 | Chiariello | 248/171 X |
| 4,061,300 | 12/1977 | Takahashi | 248/171 X |
| 4,566,661 | 1/1986 | Mestler | 248/171 |

*Primary Examiner*—Ramon O. Ramirez
*Attorney, Agent, or Firm*—Lucas & Just

[57] ABSTRACT

Bipod mortar stand, having one support mechanism and one lifting mechanism, is disclosed. The support mechanism has two legs forming a bipod. Each leg is pivoted at one end to a bracket fastened to a central leg. Each leg has drive stops on the other end. A connecting rod connects each leg to an open ring mounted on the central leg. The ring moves up and down on the central leg and can be fastened on the central leg.

The lifting mechanism is formed by the central leg and telescoping tubes and an interior tube is integral to a locknut and an exterior tube is integral to the mortar holding structure. An intermediate tube is capable of linear movement with respect to the other two tubes. A lifting device, mounted on the intermediate tube has conic gears, one conic gear is activated from an exterior crank and the other is integral to a shank which moves with the gear box and the intermediate tube. Anti-rocking guides are arranged on the exterior tube, the intermediate tube and the shank.

The lifting mechanism raises and lowers the shaft with respect to the bipod stand, in such a way that the relative position between both always remains constant.

2 Claims, 4 Drawing Sheets

BIPOD MORTAR STAND, COMPRISING ONE SUPPORT MECHANISM AND ONE LIFTING MECHANISM

SUMMARY

Bipod mortar stand, comprising one support mechanism and one lifting mechanism, in which:

(a) the support mechanism comprises two legs forming a bipod, pivoted at one end to a bracket fastened to a central leg, each leg having drive stops on the other end; two connecting rods, one each fastened to each leg, and both to an open ring mounted on the aforesaid central leg, capable of moving or being fastened to such central leg; and means of fastening such open ring to such central leg;

(b) the lifting mechanism is formed by the central leg and comprises individual tubes, one exterior, one interior and one intermediate, mounted telescopically; the exterior and interior tubes are integral to each other and, respectively, the interior tube is integral to a locknut, the exterior is integral to the mortar holder structure; and the intermediate tube is capable of linear movement with respect to the other two; a lifting device, mounted on such intermediate tube and comprising conic gears; one activated from an exterior crank and the other integral to a shank which moves with the gear box and intermediate tube; anti-rocking guides arranged one integrally to the exterior tube which guides the intermediate tube; one integral to the intermediate tube which guides the exterior pipe; and one integral to the end of the shank and which guides such shank inside the interior tube.

The lifting mechanism raises/lowers with the shaft with respect to the bipod stand, in such a way that the relative position between both always remains constant.

BIPOD MORTAR STAND

At present two basic types of mortar stands are known, using a ring:

(a) using a tripod. In this case, the shaft can slide freely in the ring;

(b) using a bipod. In this case the shaft requires a third point of attachment, which is achieved tightening the ring around the shaft.

This invention covers a bipod mortar stand.

Current bipod stands include a lifting mechanism fastened to the stand which makes the ring holding the shaft rise/fall. Thus, the relative position between the mortar shaft and the lifting mechanism is variable, making the mortar handling difficult.

In the mortar bipod stan covered in this invention the lifting mechanism rises/falls with the mortar shaft with respect to the stand, in such a way that the relative position between the lifting mechanism and the mortar shaft always remains constant.

FIG. 1 a general cross section elevation of the bipod mortar stand, in accordance with the invention, with all integral elements and/or parts, in working position, of the support mechanism.

The following is a description of an example of the practical, not limited arrangement of the invention. Other means of arrangement, in which accessory changes are introduced which do not impair its basic concept are in no way discarded; on the contrary, this invention also covers all its variants.

In accordance with the invention, and with regard to the arrangement shown, the bipod mortar stand comprises a support mechanism and a lifting mechanism.

Figure 1:
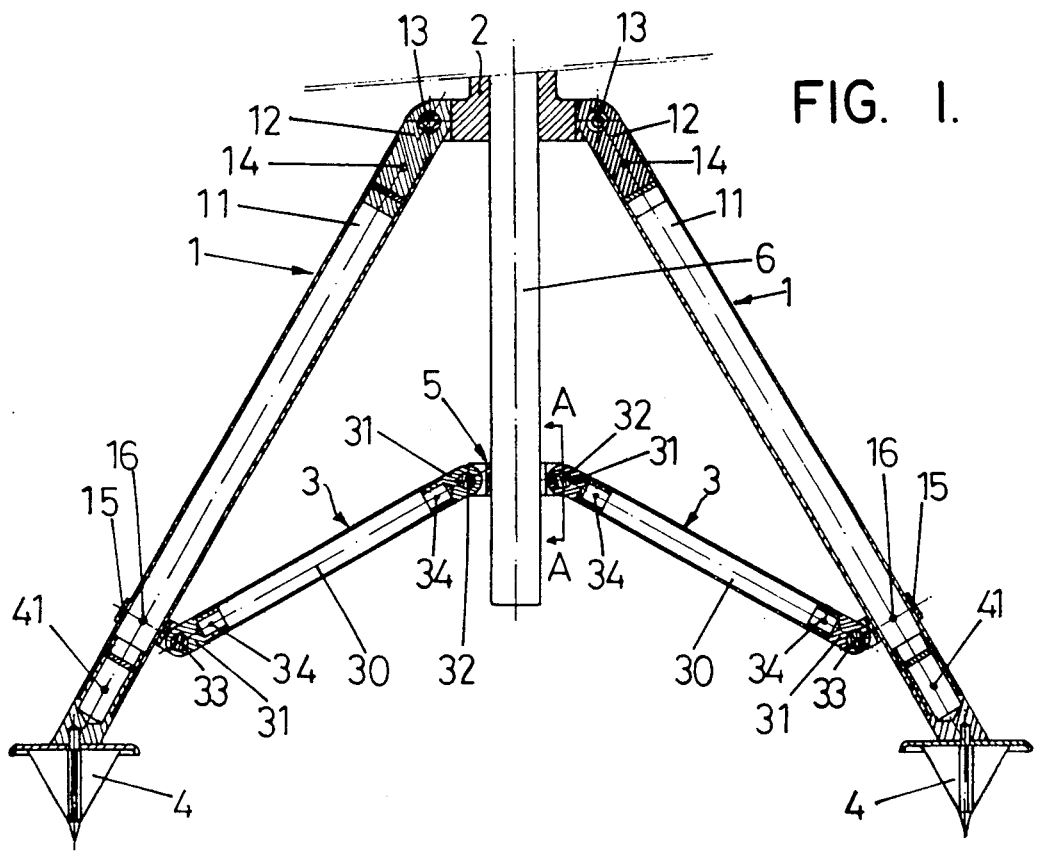

In accordance with the invention, and with regard to the arrangement shown, the support mechanism—see FIG. 1 —is comprised of:

individual legs (1),
a support (2),
connecting rods (3),
an open ring (5) which slides or is fastened to the central part (6),
fastening means (9) between such open ring (5) and the bipod central part (6)

Each leg (1)—there are two identical legs comprising a bipod—formed by:

a central tubular member (11),
a terminal butt (12) mounted internally on one end of the tubular member (11) and attached by means of pins (14),
a ring (15) externally mounted on the opposite end of the tubular member (11), and fastened with a pin (16),
a drive stop (4) mounted internally at the end of the tubular member (11), opposite the terminal butt (12) and attached by means of pins (41).

Each connecting rod (3)—there are two identical from each leg (1)—formed by a center tubular member (30), at the ends of which identical terminal butts (31) are mounted, attached to such rod by means of a pin (34).

The legs (1) have pivot means (13) which connect the support (2) to leg (1).

Pivot means (13) also allows leg (1) to pivot with respect to the central part (6).

The connecting rods (3) have pivot means (33) to the corresponding ring (15) and to the legs (1) which connects rod (13). Pivot means (33) allows pivoting between the connecting rods (3) and rings (15)—and consequently between the connecting rods (3) and the legs (1).

The connecting rods (3) are connected at their other end (32) by pivot means to the open ring (5) and allows pivoting about pivot means (32).

Such open ring (5) is clamped to the central part (6), and is formed into a ring defined by at least two opposing flanges (51) in which a fastening means (9) is inserted which closes/opens such flanges (51), thus clamping to the central part (6)—fastening—or partially releasing it therefrom—allowing sliding on such central part (6).

Figure 5:
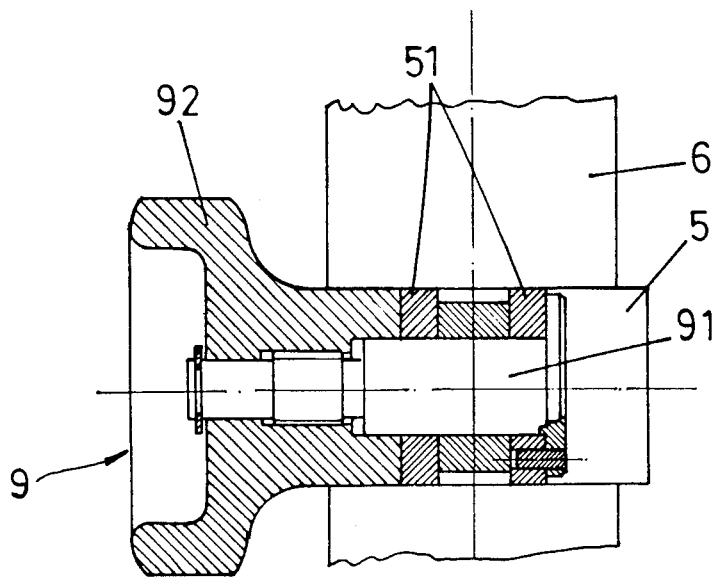
FIG. 5 shows an enlarged section, in accordance with A:A of FIG. 1.

Such means of fastening (9)—see FIG. 5—are formed by:

a threaded stud bolt (91)
a handle-locknut (92)

The threaded stud bolt (91) is located in holes in the flanges (51) of the open ring (5) and the handle-locknut (92) is screwed onto the stud bolt to close the flanges (51) on central part (6)—or to separate them—allowing the open ring (5) to slide on the central part (6).

Figure 2:
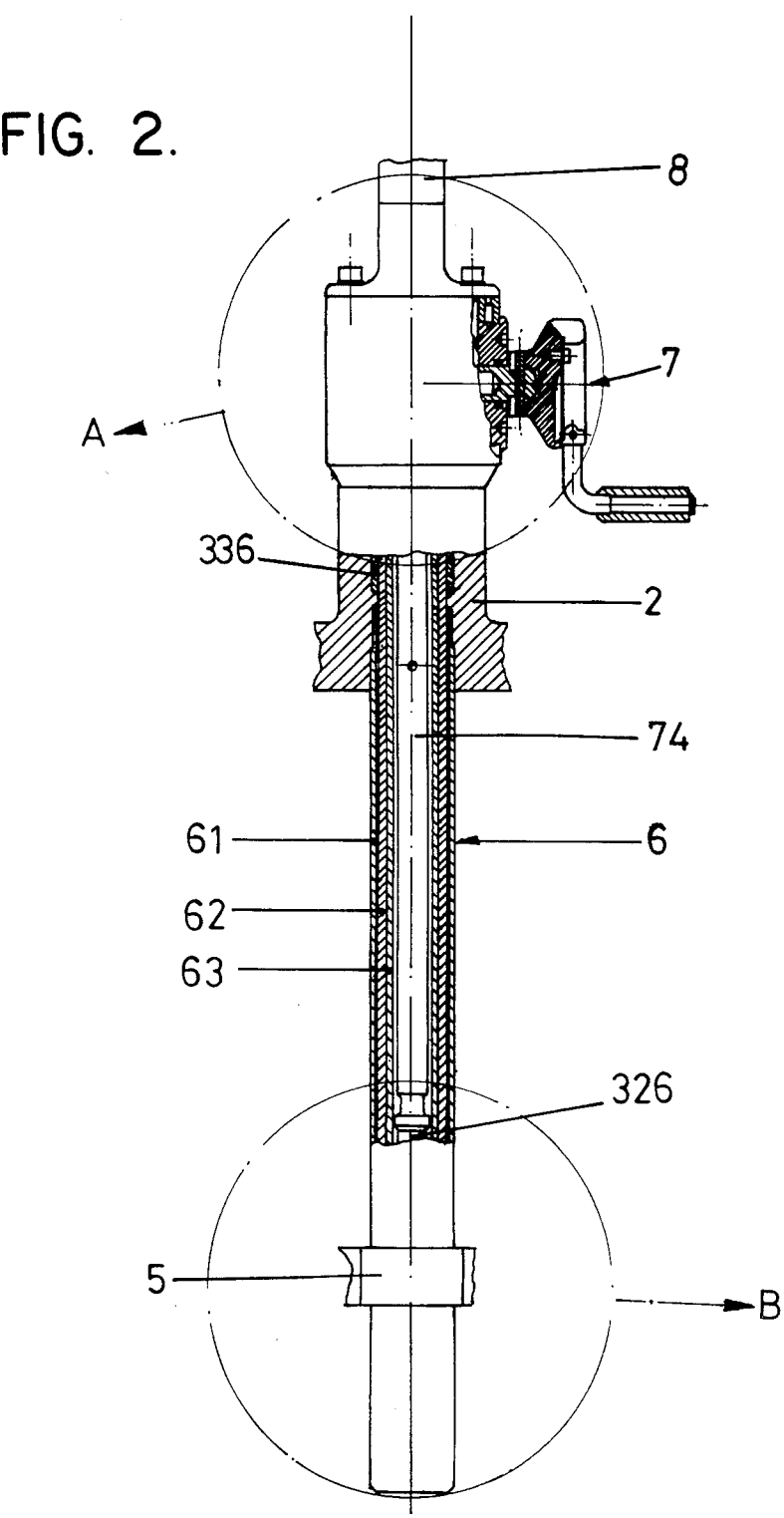
FIG. 2 shows a partial general cross section elevation of a bipod mortar stand, in accordance with the invention, with all the integral elements and/or parts of the lifting mechanism.
Figure 3:
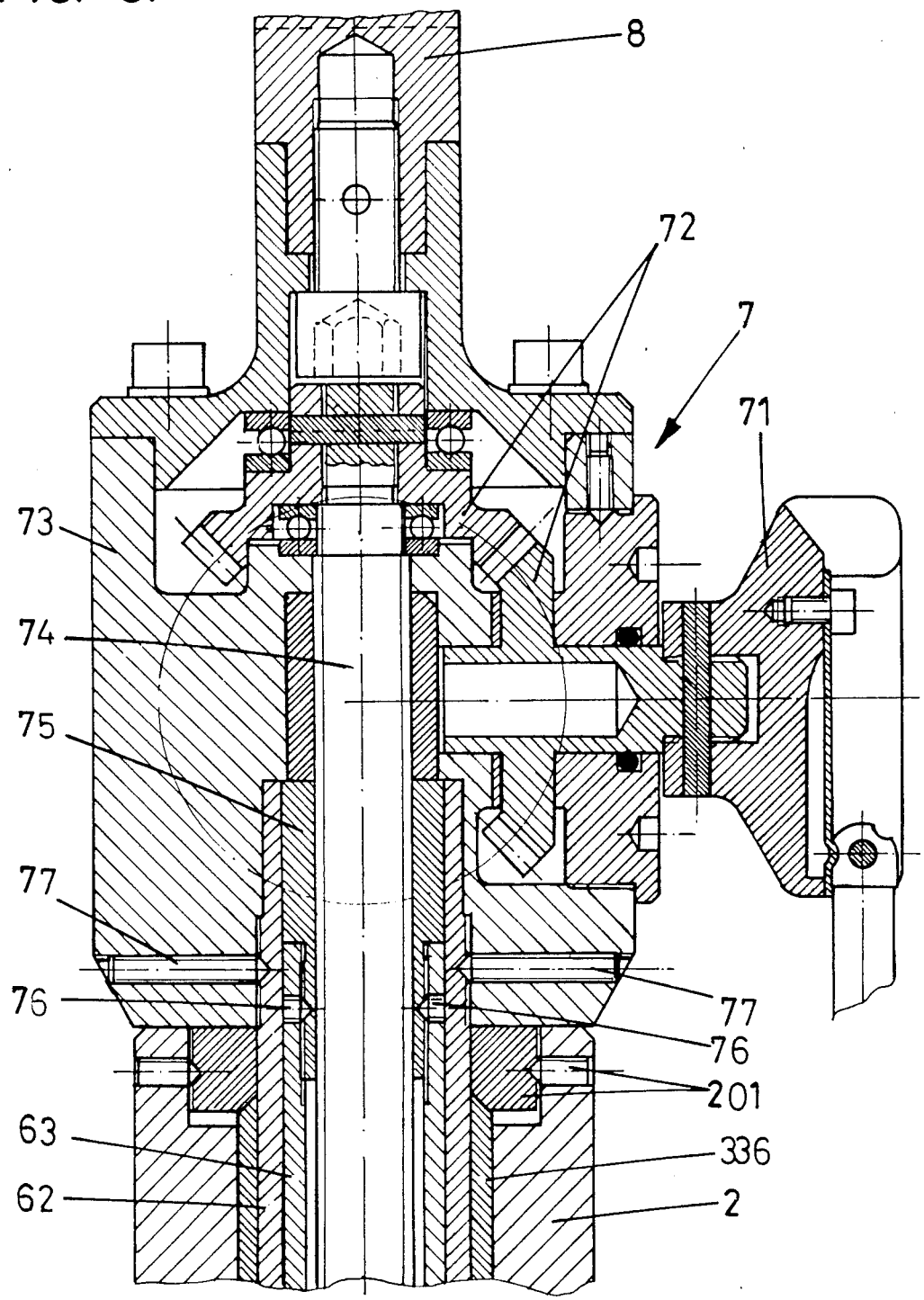
FIG. 3 shows an enlarged detail section, in accordance with A of FIG. 2.
Figure 4:
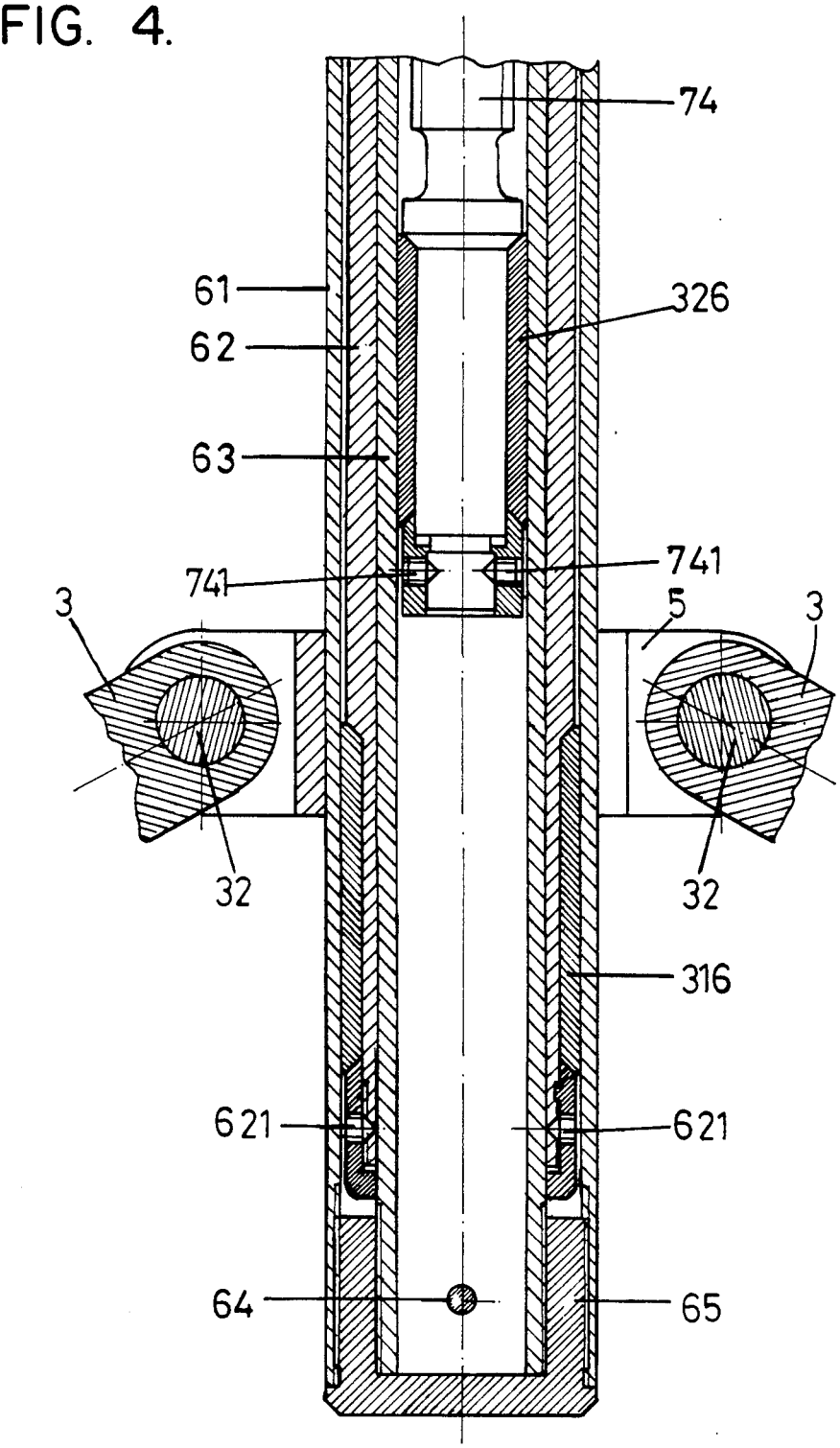
FIG. 4 shows an enlarged detail section, in accordance with B of FIG. 2.

In accordance with the invention, and with regard to the arrangement shown, the lifting mechanism—see FIGS. 2, 3 and 4—is formed by:

a central leg (6);
a lifting mechanism (7), and
anti-rocking guides

The center leg (6) comprises three tubular members (61), (62), (63) mounted telescopically.

The exterior tubular member (61) and the interior tubular member (63) are attached to each other by means of, for example, a pin (64) and/or a terminal screw plug (65)—see FIGS. 4 and 3.

The exterior tubular member (61) is attached to the mortar holder structure (2) by threading or other methods.

The top end of the interior tubular member (63) has a locknut (75)—by combined threading and setscrew(s) (76) or other methods—to which the shank (74) of the lifting mechanism (7) described elsewhere in this document, is screwed.

The intermediate tubular member (62) is telescopically movable with respect to the preceding fixed elements (61), (63), being integral, by means of setscrews (77) or other methods, to the shell (73) of the lifting mechanism (7) described elsewhere in this document.

The aforementioned lifting mechanism (7) is comprised of individual conical gears (72) arranged in a gear-box (73) and integral respectively, one to an activating crank (71) and the other to a shank (74), mounted telescopically with the tubes (61), (62), (63) of the central leg (6). One turn of the crank (71) converts into one turn of the shank (74).

The shank (74) is screwed to the locknut (75) and, since the locknut cannot move because it is integral to the interior tube (63), the shank (74) rises or falls, taking with it the entire lifting mechanism (7) and the intermediate tube (62) to which it is integral by means of setscrews (77).

Consequently, the relative distance between the crank (71) of the lifting mechanism (7) and other mortar elements —not shown—mounted on a column (8) integral to such lifting mechanism (7) will always remain constant.

In order to prevent the parts from rocking during relative movement, this invention contemplates anti-rock guides set, in a preferred practical arrangement, as follows:

one guide (316) integral to the intermediate tube (62) by means of setscrew (621) or other means—arranged in the end area of such intermediate tube, and which guides one guide (326), integral to the shank (74), by means of setscrew (741) or other method-, arranged in the end area of such shank (74), and which guides it on the aforementioned interior tube (63);

one guide (336), integral to the mortar holder structure (2) by means of crown/setscrew assembly (201) or other method and which guides the aforementioned intermediate tube (62) on such structure (2).

I claim:

1. A bipod mortar stand, characterized as comprising:
(a) a support mechanism formed by:
  (a1) two bipod legs forming a bipod, pivoted at one end to a support, said support fastened to a central leg, said bipod legs having drive stops on their other end;
  (a2) two pivoted connecting rods, one of said pivoted connecting rods connected to each bipod leg, and both said pivoted connecting rods connects to an open ring mounted on the central leg, said open ring capable of moving or being fastened to said central leg;
  (a3) means of fastening the open ring to the central leg; and
(b) a lifting mechanism formed by:
  (b1) the central leg comprised of: individual tubes, one exterior and another interior, said tubes telescopically mounted and integral to each other, the interior tube connected to a locknut and the exterior tube connected to the mortar holder structure; and one intermediate tube, mounted telescopically between said exterior and interior tubes, said intermediate tube capable of linear movement with respect to said exterior and interior tube;
  (b2) a lifting device, mounted on conical gears; one conical gear activated from an exterior crank with which said one conical gear is integral; and the other conical gear integral to a shank, which turns the locknut, for moving with said conical gears and intermediate tube;
  (b3) anti-rocking guides, arranged one on the mortar holder structure, integral to the exterior tube and which guides the intermediate tube; one integral to the intermediate tube and which guides it on the exterior tube; and one integral to the end of the shank and which guides it on the interior tube.

2. Bipod mortar stand, in accordance with claim 1 wherein the method of fastening the open ring is comprised of a threaded pin inserted in holes provided in flanges on the open ring, and a handle-lock which is screwed onto such pin.

* * * * *